United States Patent
Hartelius et al.

(10) Patent No.: US 12,408,627 B2
(45) Date of Patent: Sep. 9, 2025

(54) PET GROOMING AND MASSAGE TOOL

(71) Applicant: Hartdesign! Ltd., Chicago, IL (US)

(72) Inventors: Mark Hartelius, Chicago, IL (US); Kimberlee Wilkens, Chicago, IL (US)

(73) Assignee: Hartdesign! Ltd., Chicago, IL (US)

( * ) Notice: Subject to any disclaimer, the term of this patent is extended or adjusted under 35 U.S.C. 154(b) by 198 days.

(21) Appl. No.: 17/531,891

(22) Filed: Nov. 22, 2021

(65) Prior Publication Data
US 2022/0400652 A1    Dec. 22, 2022

Related U.S. Application Data

(60) Provisional application No. 63/211,252, filed on Jun. 16, 2021.

(51) Int. Cl.
*A01K 13/00* (2006.01)

(52) U.S. Cl.
CPC .................. *A01K 13/002* (2013.01)

(58) Field of Classification Search
CPC ...... A01K 13/002; A01K 13/00; A45D 24/10; A45D 24/06; A45D 24/14
USPC ...................................... 15/236.08
See application file for complete search history.

(56) References Cited

U.S. PATENT DOCUMENTS

| | | | | |
|---|---|---|---|---|
| 180,749 A | * | 8/1876 | Bristol | A01K 13/002 119/632 |
| 241,546 A | * | 5/1881 | King | A01K 13/002 119/631 |
| 381,550 A | * | 4/1888 | Hird | A01K 13/002 119/623 |
| 430,628 A | * | 6/1890 | Decker | A01K 13/002 119/632 |
| 531,412 A | * | 12/1894 | Garvey | A01K 13/002 119/625 |
| 698,946 A | * | 4/1902 | Hershberger | A01K 13/002 119/633 |

(Continued)

FOREIGN PATENT DOCUMENTS

DE    1047520 B  *  12/1958

OTHER PUBLICATIONS

"Faux Leather Thesis Springback Binder" by BinderTek <https://www.bindertek.com/faux-leather-thesis-springback-binder-1-spine/? setCurrencyId=1&sku=TBXS-L%20Green&gad_source=1&gclid=EAIaIQobChMIs6qFtfiNhgMV32JHAR2S5QxfEAQYBCA-BEgLGWvD_BwE> (Year: 2019).*

(Continued)

*Primary Examiner* — Morgan T Jordan
(74) *Attorney, Agent, or Firm* — McDonald Hopkins LLC

(57) ABSTRACT

A hand operated pet grooming and massage tool that transitions between a grooming tool and a massaging tool based on the flex state of the hand operating the tool is disclosed herein. An example grooming tool includes a body, wing members, and a blade holder. The body is made of a deformable material configured to deform between a first position and a second position. The wing members are each connected to opposite sides of the body. The body defines a first distance between in wing members in the first position and a second, shorter distance in the second position. The blade holder is connected to the body and is configured to affix to a grooming blade. When installed, the blade is positioned to groom when the body is in the first position and is not in a position to groom when the body is in the second position.

16 Claims, 11 Drawing Sheets

(56) References Cited

U.S. PATENT DOCUMENTS

| | | | | |
|---|---|---|---|---|
| 793,784 | A | * | 7/1905 | Hackett ................ A01K 13/002 261/119.1 |
| 949,868 | A | * | 2/1910 | Whetstone ........... A01K 13/002 119/631 |
| 1,185,876 | A | * | 6/1916 | Colgan ................ A01K 13/002 119/633 |
| 2,199,282 | A | * | 4/1940 | Condron ................ A45D 24/14 132/149 |
| 2,821,203 | A | * | 1/1958 | Kesterson ............... A45D 24/10 132/122 |
| 4,617,875 | A | * | 10/1986 | Holland ............... A01K 13/003 401/281 |
| 6,810,553 | B1 | * | 11/2004 | Otsuji .................... A45D 19/00 15/210.1 |
| 8,100,089 | B1 | * | 1/2012 | Francoeur ............ A01K 13/002 119/625 |
| 10,799,014 | B2 | * | 10/2020 | Binnington ............. A46B 5/021 |
| D903,955 | S | * | 12/2020 | Singer ........................... D30/159 |
| 2010/0132625 | A1 | * | 6/2010 | Dionne ................ A01K 13/002 119/602 |
| 2013/0061813 | A1 | * | 3/2013 | Dionne ................ A01K 13/002 119/625 |
| 2017/0172105 | A1 | * | 6/2017 | Murrihy ................. A46B 9/023 |
| 2020/0170318 | A1 | * | 6/2020 | Davis ..................... A45D 34/00 |

OTHER PUBLICATIONS

"3 inch zipper binder" by Kinbashi <https://www.amazon.com/3-Inch-Zipper-Binder-Expanding-Shoulder/dp/B07YSF1Y9C?th=1> (Year: 2019).*

* cited by examiner

PET GROOMING AND MASSAGE TOOL

RELATED APPLICATIONS

The application claims priority to U.S. Provisional Application No. 63/211,252 entitled, "PET GROOMING AND MASSAGE TOOL," filed Jun. 16, 2021, which is incorporated by reference in its entirety.

TECHNICAL FIELD

The present disclosure generally relates pet grooming supplies and, more specifically, a pet grooming and massage tool.

BACKGROUND

Regular grooming of an animal companion, such as a dog, is an important part maintaining the health of the animal companion. Grooming an animal companion can have numerous benefits, such as removing dead hair, stimulating and cleaning the skin, maintaining a healthy coat by helping to distribute natural oils, etc. Regular grooming can also provide an opportunity to inspect the animal companion for any potential health problems. Additionally, massaging a pet companion may provide bonding time, improve circulation, reduce stress and anxiety, and provide comfort, etc.

SUMMARY

As described herein, a hand operated pet grooming and massage tool transitions between a grooming tool and a massaging tool based on the flex state of the hand operating the tool. The tool includes a blade configured to groom an animal companion. The blade is attached to a flexible body with wing members. When the user's hand is cupped, the body flexes to position the blade away from the coat of the animal companion. The wing members can then be used to massage the animal companion. When user's hand is in a flat position, the body flattens to position the blade against the coat of the animal companion. In such a manner, the user can quickly and intuitively change which action (e.g., grooming or massaging, etc.) is being performed on the animal companion. These and other features and advantages of the present disclosure are set forth in the following specification, drawings and claims.

An example grooming mount includes a body, wing members, and a blade holder. The body is made of a deformable material configured to deform between a first position and a second position. Each of the wing members are connected to opposite sides of the body. The body defining a first distance between in wing members in the first position and a second, shorter distance in the second position. The blade holder is connected to the body. The blade holder configured to affix to a grooming blade, wherein, when installed, the blade is positioned to groom when the body is in the first position and is not in a position to groom when the body is in the second position.

An example grooming tool includes a grooming blade, a grooming mount, and a handle. The grooming mount includes a body, wing members, and a blade holder. The body is made of a deformable material and is configured to deform between a first position and a second position. The body defines a first distance between in wing members in the first position and a second, shorter distance in the second position. The blade holder is connected to the body configured to affix to the grooming blade to the grooming mount. The blade is positioned to groom when the body is in the first position and is not in a position to groom when the body is in the second position. The handle is configured to receive a hand and is affixed to the grooming mount.

BRIEF DESCRIPTION

Operation of the disclosure may be better understood by reference to the following detailed description taken in connection with the following illustrations, wherein.

FIGS. 2A, 2B, 2C, and 2D illustrate various views of an example body of a pet groomer, in accordance with the teachings of this disclosure.

FIGS. 3A, 3B, 3C, and 3D illustrate various views of an example blade of the pet groomer, in accordance with the teachings of this disclosure.

Figure 4:
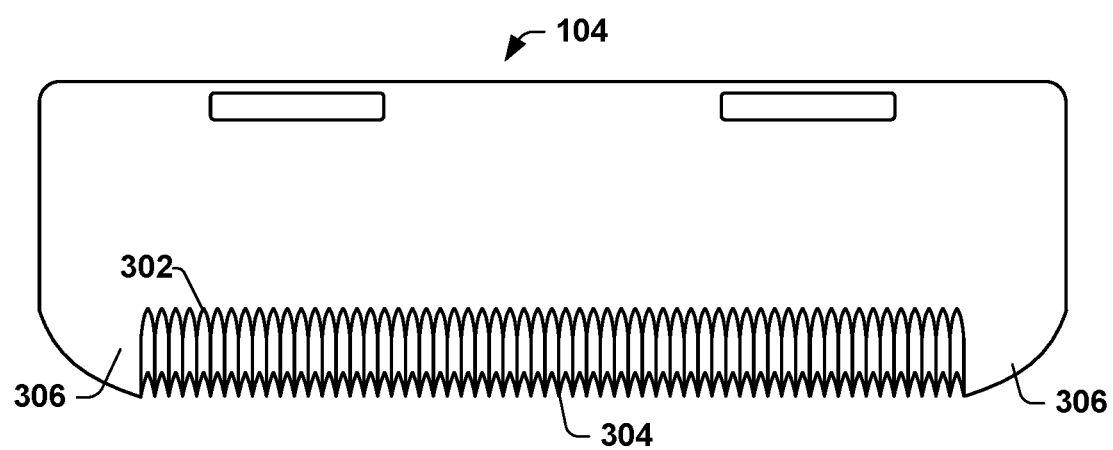

FIG. 4 illustrates the example blade of the example pet groomer of FIG. 5, in accordance with the teachings of this disclosure.

Figure 5A:
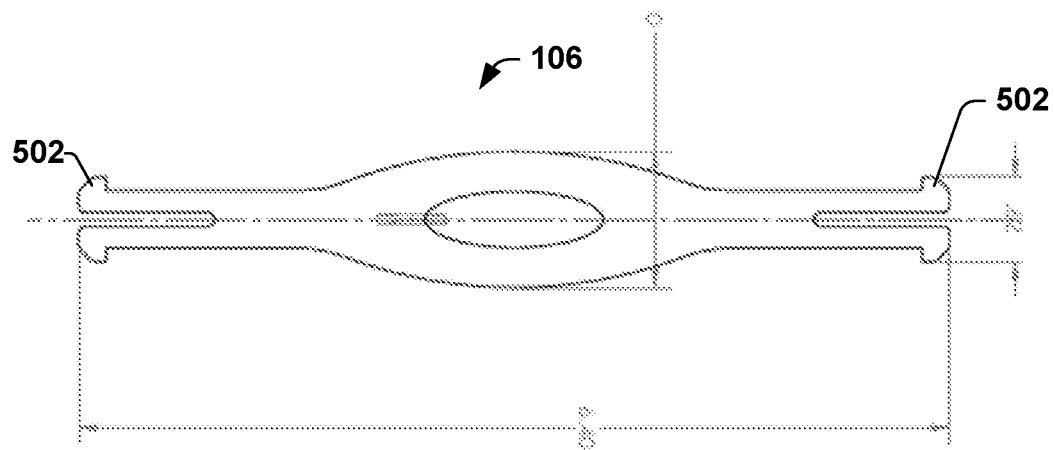
Figure 5B:
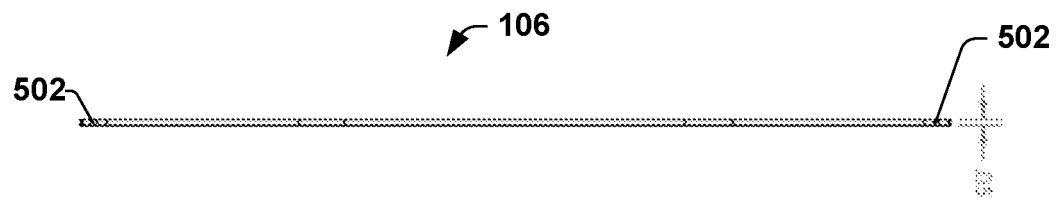

FIGS. 5A and 5B illustrate various views of an example handle of a pet groomer, in accordance with the teachings of this disclosure.

Figure 6A:
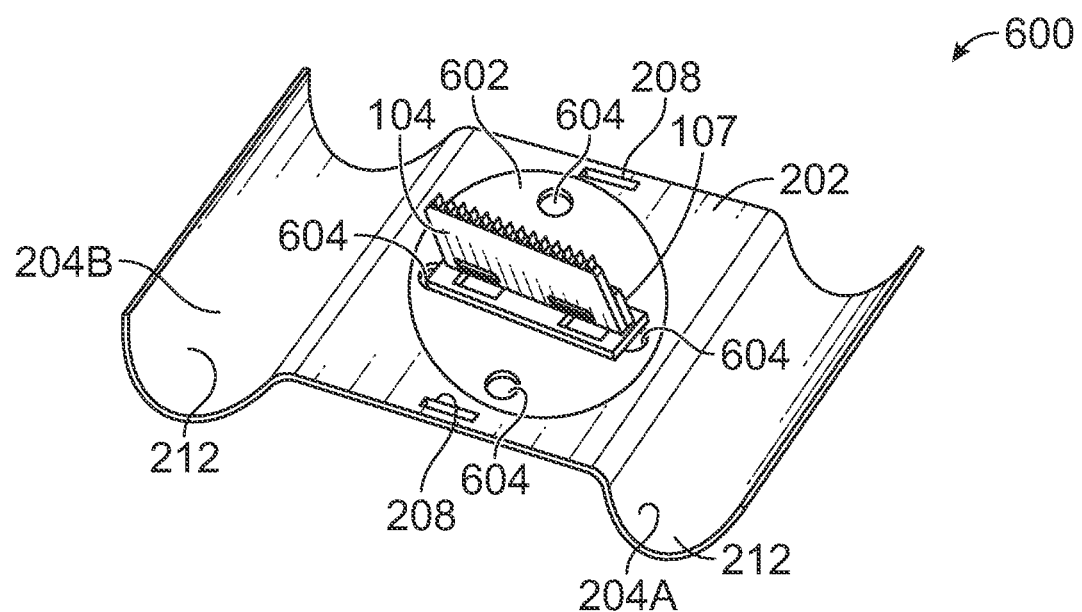
Figure 6B:
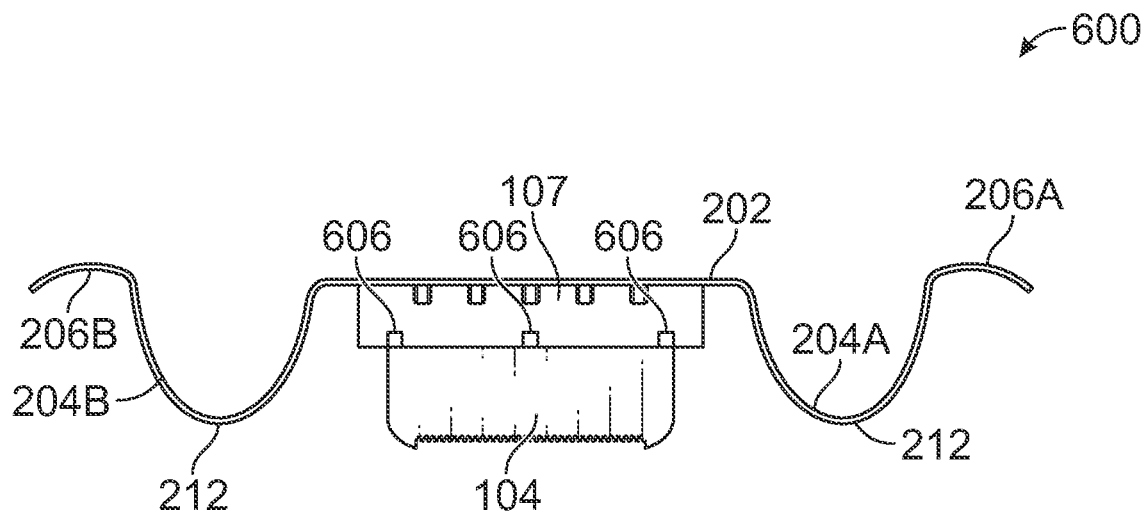

FIGS. 6A and 6B illustrates an example of a pet groomer, in accordance with the teachings of this disclosure.

FIGS. 7A, 7B, 7C, 7D, and 7E illustrate various views of an example pet groomer, in accordance with the teachings of this disclosure.

Figure 7A:
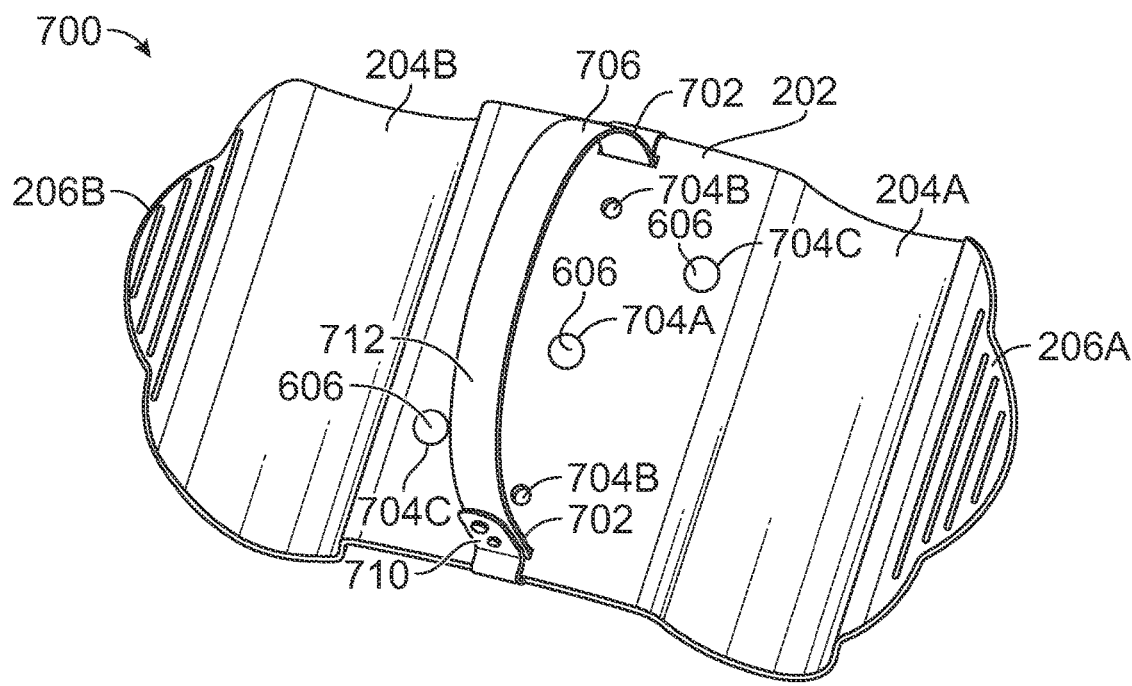
Figure 7B:
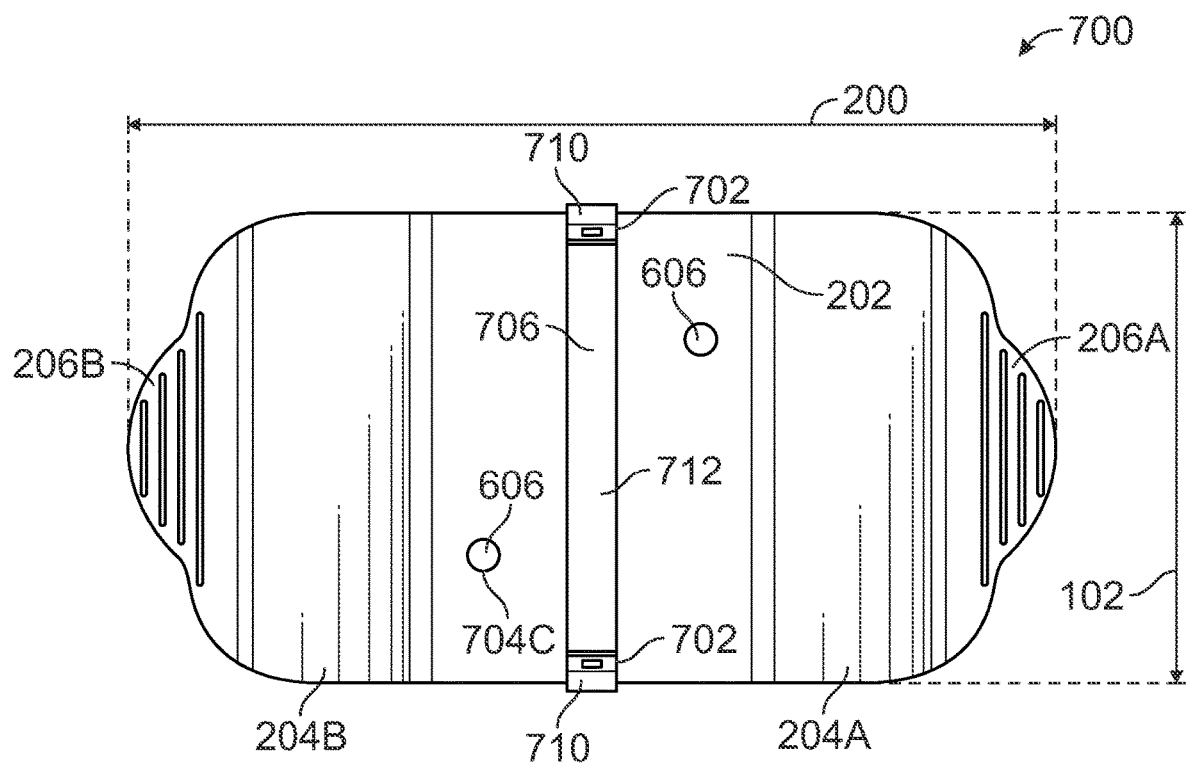
Figure 7C:
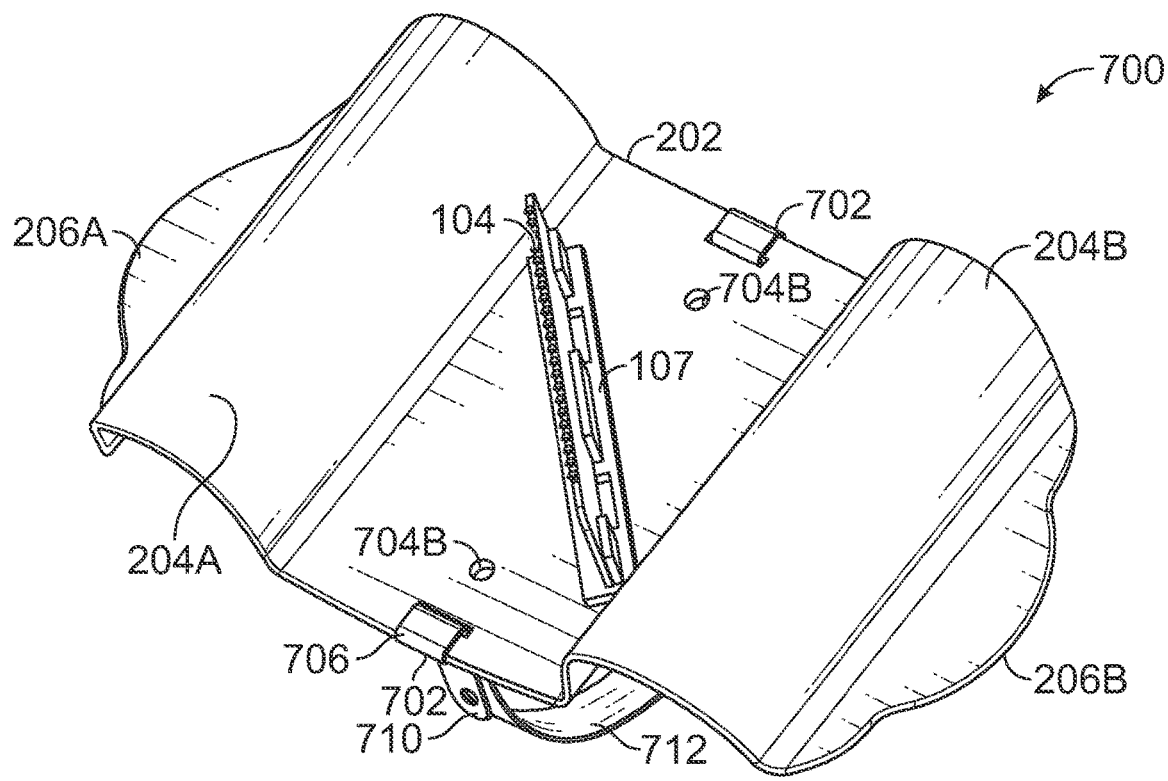
Figure 7D:
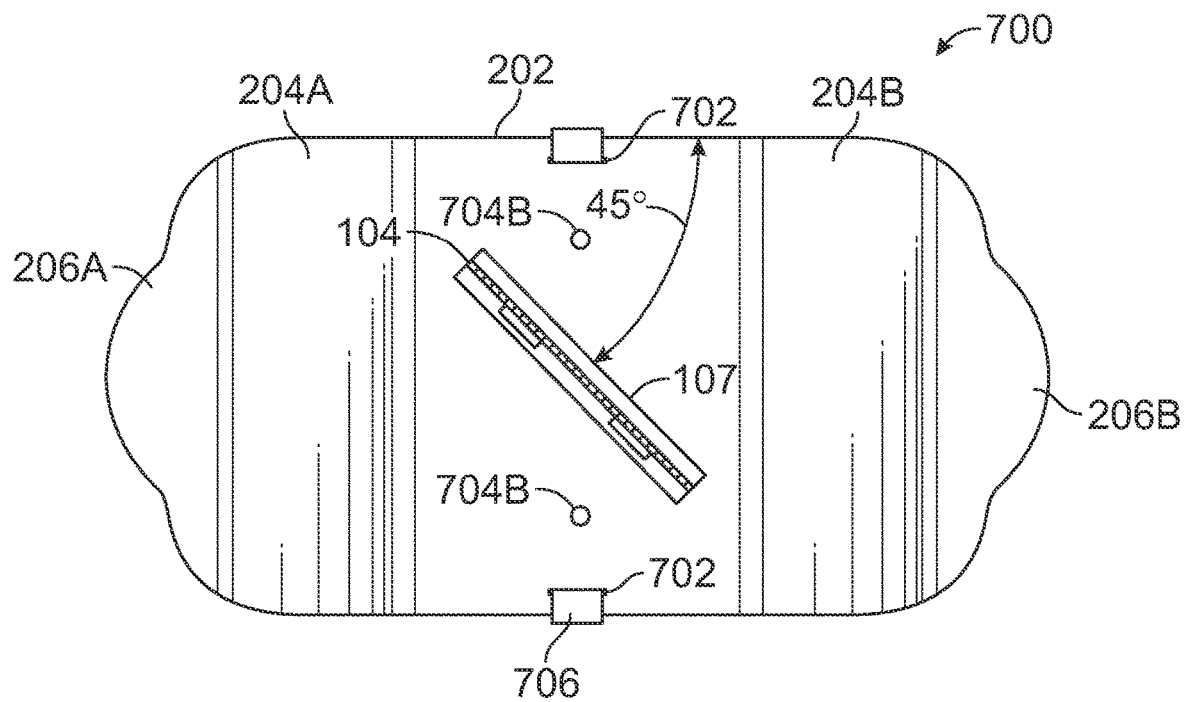
Figure 7E:
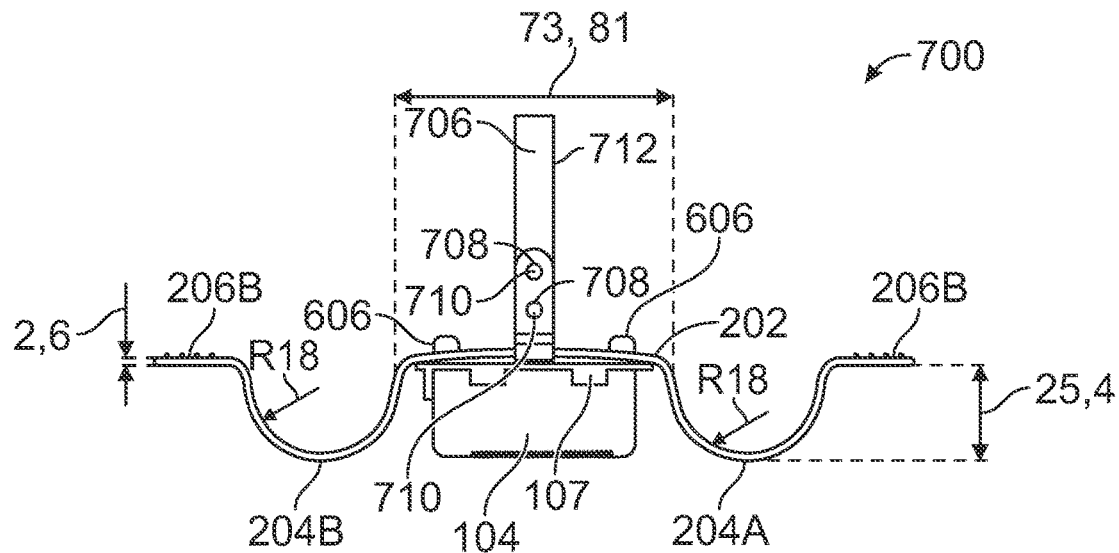
Figure 8:
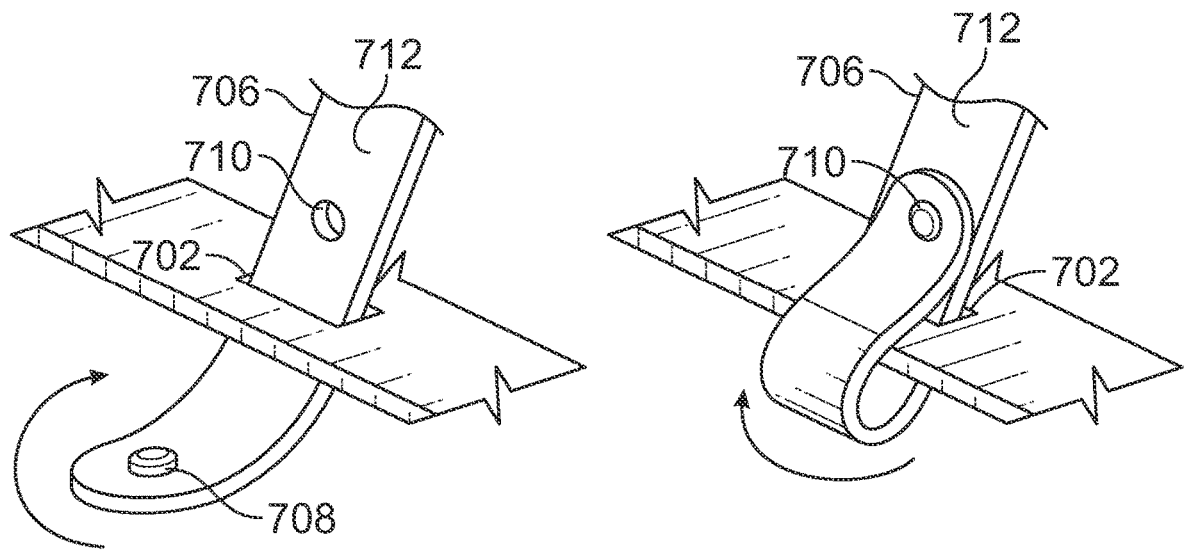

FIG. 8 is a close up view of a handle being connected to a body of the example pet groomer of FIGS. 7A, 7B, 7C, 7D, and 7E, in accordance with the teachings of this disclosure.

DESCRIPTION

Figure 1A:
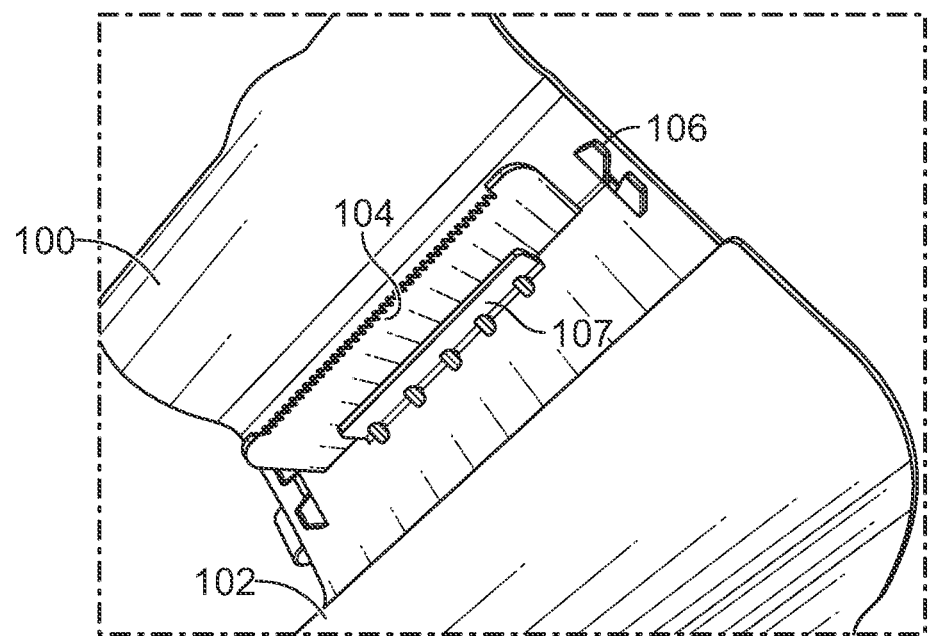
FIG. 1A is a perspective view of an example pet groomer, in accordance with the teachings of this disclosure.
Figure 1B:
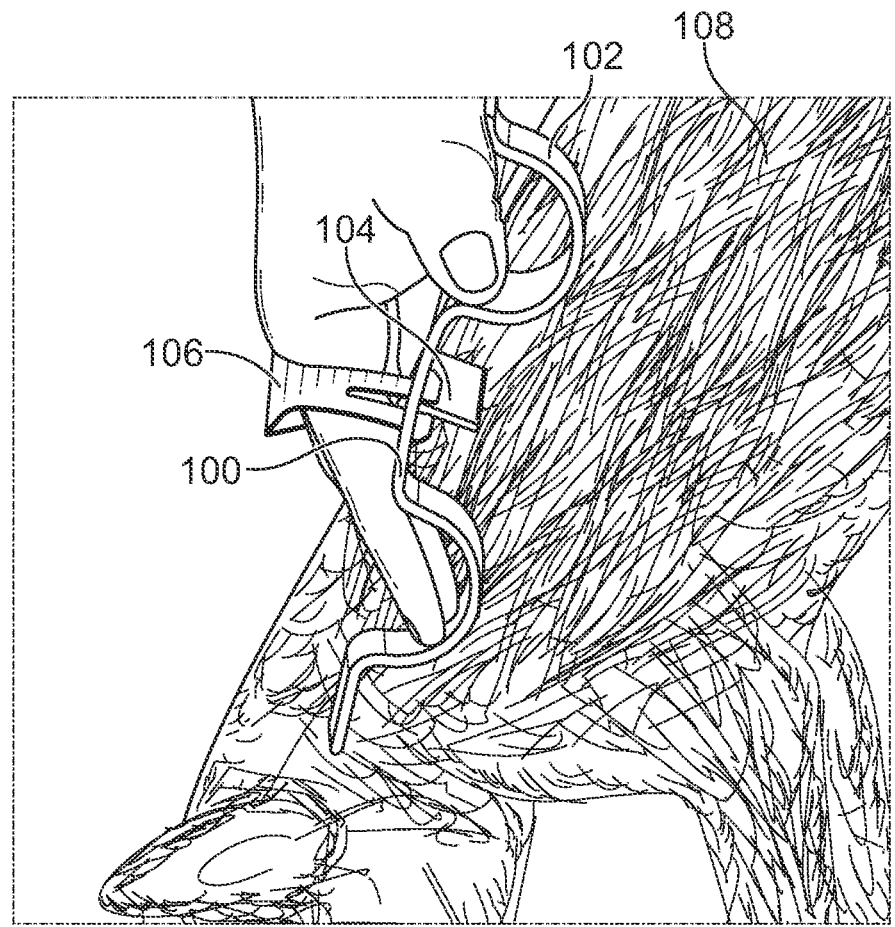
FIG. 1B illustrates the example pet groomer in use, in accordance with the teachings of this disclosure.
Figure 1C:
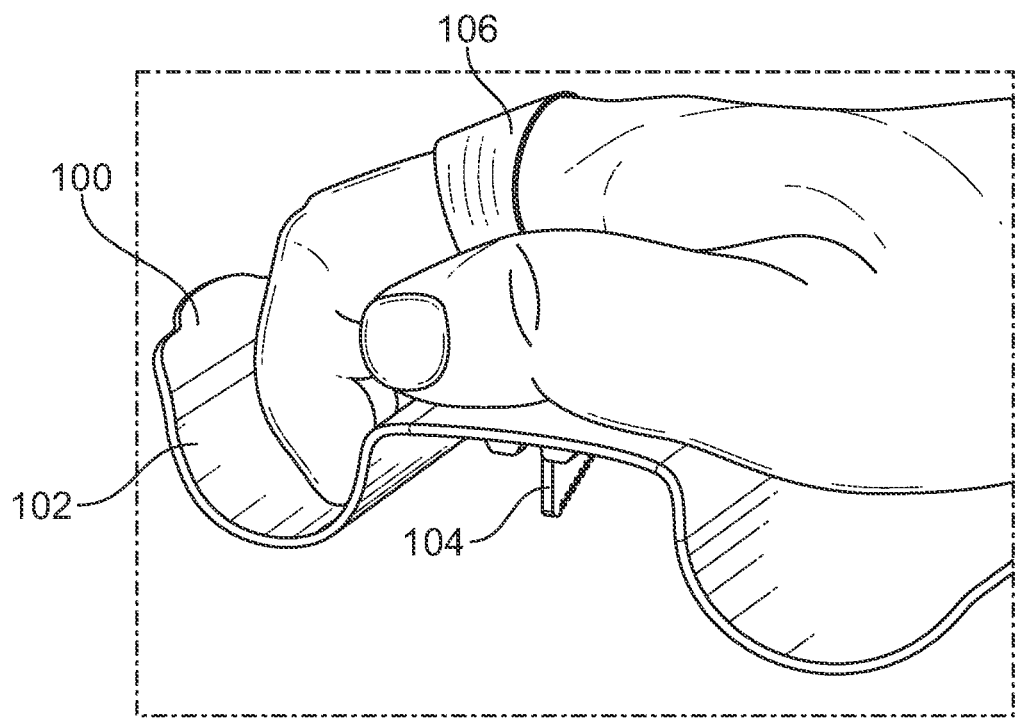
FIG. 1C illustrates the example pet groomer is an example flat or grooming position, in accordance with the teachings of this disclosure.
Figure 1D:
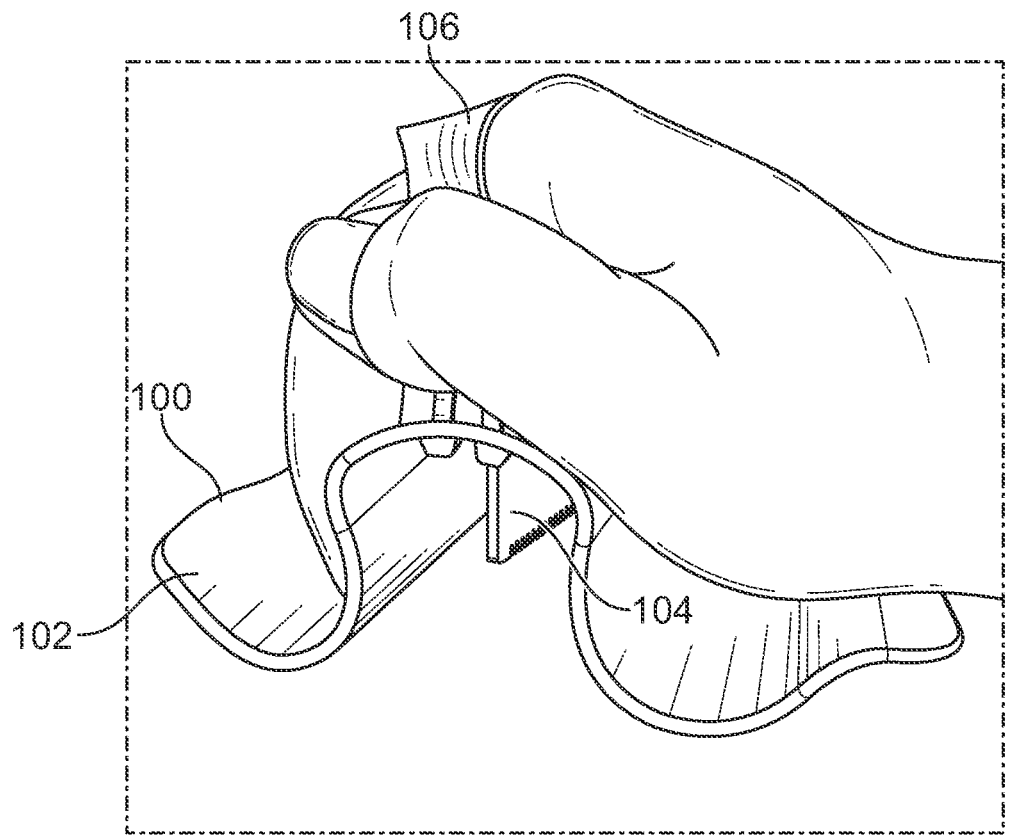
FIG. 1D illustrates the example pet groomer is an example cupped or massage position, in accordance with the teachings of this disclosure.

FIGS. 1A, 1B, 1C, and 1D illustrate an example pet groomer 100 configured to act as a groomer device and a massaging device based on the configuration of a hand of a user. In the illustrated examples, the pet groomer 100 includes a body 102, a blade 104, a handle 106, and a blade mount 107. In use, the hand of the user fits through the handle 106 so that one of more fingers are positionable in one portion of the body and a thumb and/or back of the palm is positionable in another portion of the body 102 to position the body 102 in the palm of the hand. The body 102 is flexible and deforms. For example, as illustrated in FIGS. 1A, 1B, 1C, and 1D, the body 102 deforms based on the positioning of the fingers relative the thumb (e.g., the position of the first portion of the body 102 relative to the second portion of the body 102, etc.). As illustrated in FIG. 1C, when the tips of the fingers are extended away from the thumb and/or the back of the palm (e.g., the main portion of the body 102 is relatively flat), the blade 104 is in a position to contact the coat of a pet companion 108. This position is sometimes referred to as the "flat position" or the "grooming position." As illustrated in FIG. 1D, when the tips of the fingers are brought towards the thumb and/or back of the palm (e.g., the main portion of the body 102 is deformed to be curved such that the first portion and the second portion of the body 102 are closer to each other, etc.), the body 102 contacts the pet companion to, for example, provide a massaging surface while the blade 104 is away from the coat of the animal companion. This position is sometimes referred to as the "cupped position" or the "massaging position."

Figure 2A:
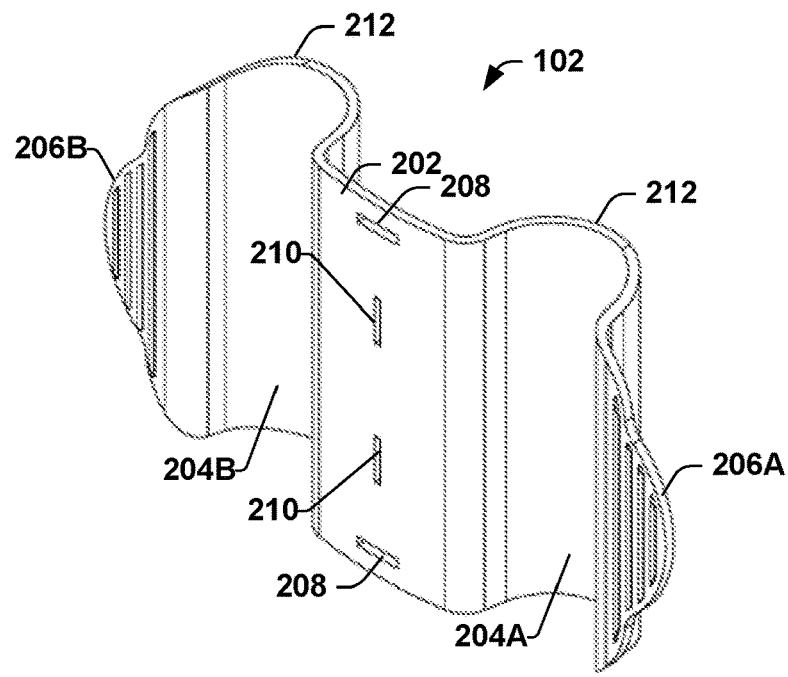
Figure 2B:
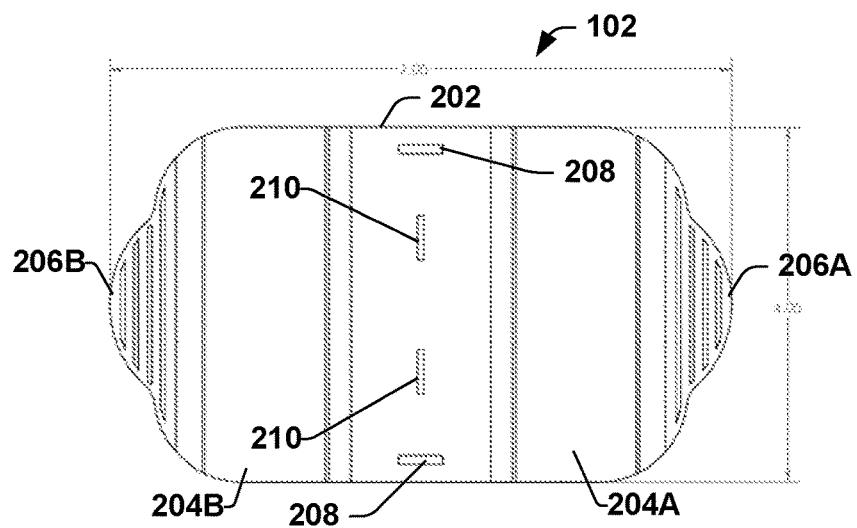
Figure 2C:
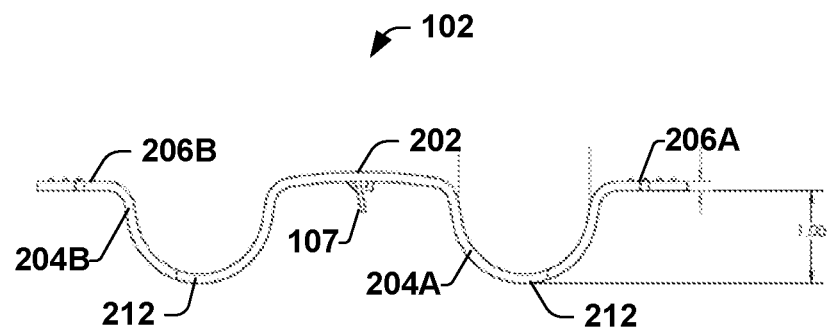
Figure 2D:
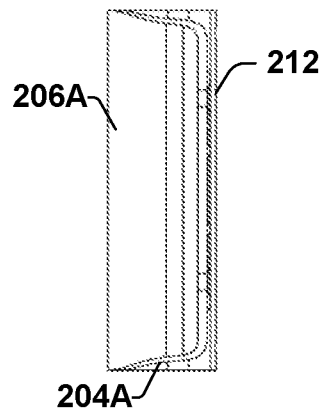

FIGS. 2A, 2B, 2C, and 2D illustrate various views of the body 102 of a pet groomer 102. FIG. 2A illustrates a perspective view of the body 102 of a pet groomer 102. FIG. 2B illustrates a top view of the body 102 of a pet groomer 102. FIG. 2C illustrates a front view of the body 102 of a pet groomer 102. FIG. 2D illustrates a side view of the body 102 of a pet groomer 102. In the illustrated examples, the body 102 includes a main body 202, wing members 204A and 204B (collectively "wing members 204"), and handle portions 206A and 206B (collectively "handle portions 204"). The body 102 is made of a flexible material (e.g., such as polypropylene) that allows the main body 202 to flex such that the wing members 202 may be brought closer to each other.

The main body 202 is connected the wing members 204. In the illustrated examples, the main body 202 is connected integrally formed with the wing members 202. Alternatively, the main body 202 and the wing members 202 may be separate components such that the wing portions 204 attach to the main body 202. In some such examples, the main body 202 and the wing members 204 may be made of different materials where the main body 202 is made of a flexible material and the wing members 204 are made of a more rigid material. The main body 202 defines handle apertures 208 and mount apertures 210. The handle apertures 208 are configured to each receive (e.g., via a snap fit, etc.) different ends of the handle 106. The mount apertures 210 is configured to receive (e.g., via a snap fit, etc.) the blade mount 107. Alternatively, in some examples, the blade mount 107 may be integrally formed with the main body 202.

The wing members 204 generally have a semi-circular or semi-ellipsoidal cross section. The wing members 204 are configured such that, when the pet groomer 100 is in the flat position (e.g., the main body 202 is relatively flat), the blade 104 is positioned such that the blade 104 is in contact with the coat of the animal companion to groom the animal companion. Additionally, the wing members 204 are configured such that, when the pet groomer 100 is in the cupped position (e.g., the main body 202 is deformed), the blade 104 is positioned such that the blade 104 is not in contact with the coat of the animal companion while base surfaces 212 of the wing members 204 are in contact with the animal companion.

The handle portions 206 extend from the corresponding wing members 204 on the opposite side of the wing members 204 as the main body 202. In the illustrated examples, the handle portions 206 are integrally formed with the wing members 204. When the pet groomer 100 is in the cupped positioned (e.g., as illustrated in FIG. 1D), the handle portions 206 may contact the animal companion.

In use, the hand of the user fits through the handle 106 so that one of more fingers are positionable in one wing portion 204A of the body 102 and a thumb and/or back of the palm is positionable in the other wing portion 204B to position the body 102 in the palm of the hand. When the tips of the fingers are extended away from the thumb and/or the back of the palm (e.g., the main portion 202 is relatively flat), the blade 104 is in a position to contact the coat of a pet companion 108. When the tips of the fingers are brought towards the thumb and/or back of the palm (e.g., the main portion 202 of the body 102 is deformed to be curved such that the wing members 204 are closer to each other, etc.), the wing members 204 and/or the handle portions 206 contact the pet companion to, for example, provide a massaging surface while the blade 104 is away from the coat of the animal companion.

Figure 3B:
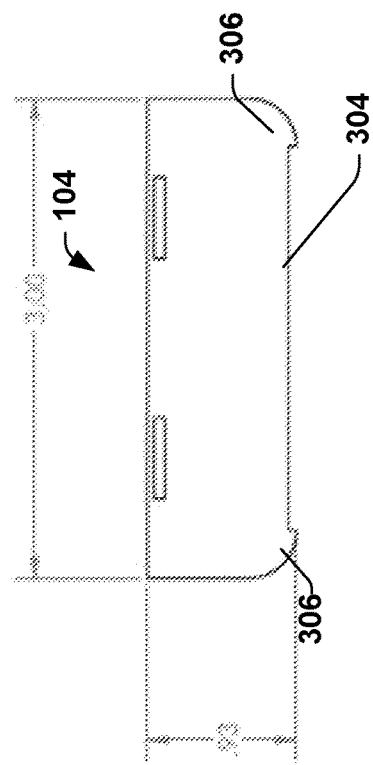
Figure 3D:
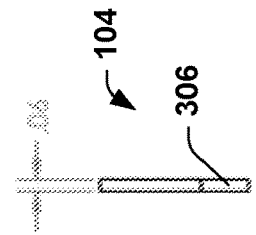
Figure 3A:
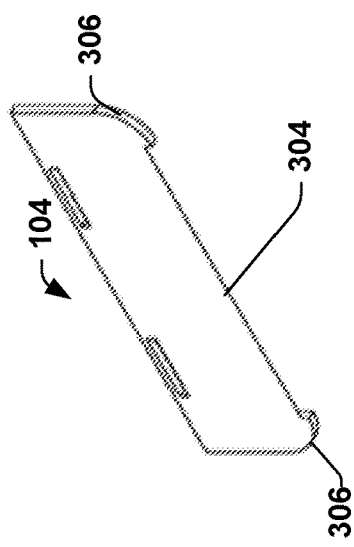
Figure 3C:
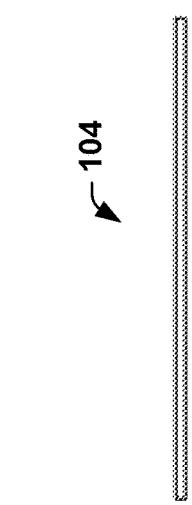

FIGS. 3A, 3B, 3C, 3D, and 4 illustrate various views of the blade 104 of the pet groomer 100. FIG. 3A illustrates a perspective view of the blade 104. FIG. 3B illustrates a front view of the blade 104. FIG. 3C illustrates a bottom view of the blade 104. FIG. 3D illustrates a side view of the blade 104. FIG. 4 illustrates a comb section 302 defined in a blade surface 304 of the blade 104. In the illustrated examples, the blade 104 includes protector portions 306 that flank each side of the blade surface 304. The protector portions 306 prevent and/or inhibit the comb section 302 interfacing with coat when the blade 104 is being moved coplanar with a surface of the blade 104. In the illustrated example, the blade 104 defines mount apertures 308 to mount (e.g., via a snap fit, etc.) into the blade mount 107.

FIGS. 5A and 5B illustrate the handle 106 of the pet groomer 100. FIG. 5A illustrates a top view of the handle 106. FIG. 5B illustrates a side view of the handle 106. The handle 106 is made of a flexible material. The handle 106, when attached to the body 102, defines a space through which a hand may be placed to facilitate control of the pet groomer 100. The handle devices locking tabs 502 that interface (e.g., snap fit into, etc.) the handle apertures 208 of the body 102.

FIGS. 6A and 6B illustrate a pet groomer 600. In the illustrated example, the main body 202 of the pet groomer 600 is configured to have the orientation of the blade 104 change. In some examples, pet groomer 600 includes a turning element 602 (sometimes referred to as a "dsick") that is rotatably connected to a corresponding aperture defined in the main body 202. The turning element 602 may rotate and lock between two settings (e.g., rotate 90 degrees). The first setting positions the blade 104 to be substantially parallel to the wing members 204. The second setting positions the blade 104 to be substantially perpendicular to the wing members 204. In some such examples, the blade mount 107 is affixed and/or otherwise attached to the turning element 602. Alternatively or additionally, in some examples, the main body 202 (or the turning element 602) may define mounting apertures 604 to facilitate mouthing the blade 104 in a position either parallel to the wing members 204 or perpendicular to the wing members 204. In some examples, the blade 104 includes stands 606 that lock into (e.g., snap fit) into the mounting apertures 604. Alternatively, in some examples, the blade 104 may snap into (e.g., via the mount apertures 308) the blade mount 107 (as described above). The blade mount 107 may include the stands 606 to lock into (e.g., snap fit, friction fit, etc.) into the mounting apertures 604.

FIGS. 7A, 7B, 7C, 7D, and 7E illustrate various views of an example pet groomer 700. FIG. 7A illustrates a top perspective view of the pet groomer 700. FIG. 7B illustrates a top view of the pet groomer 700. FIG. 7C illustrates a bottom perspective view of the pet groomer 700. FIG. 7D illustrates a bottom view of the pet groomer 700. FIG. 7E illustrates a side view of the pet groomer 700. The pet groomer 700 is configured such that the blade 104 is repositionable to at least two positions. In some examples, the pet groomer 700 is configurable between a parallel position where the blade is substantially parallel with the wing members 204 and an offset position where the blade 104 is positioned a predetermined number of degrees (e.g., 30 degrees, 45 degrees, 60 degrees). As best illustrated in FIGS. 7C and 7D, in the illustrated example, the blade 104 is rotated 45 degrees relative the wing members 204 in the offset position.

The pet groomer 700 includes the main body 202, the wing members 204 and the handle portions 206. The main body 202 defines handle holes 702 and position holes 704A, 704B, and 704C (collectively the "position holes 704"). The position holes 704 are located on the main body 202 to accept the blade mount 107 in the parallel position and the offset position. In the illustrated example, the main body 202 defines a central position hole 704A. The main body 202 also defines the parallel position holes 704B that, in conjunction with the central position hole 704A, facilitate receiving the blade mount 107 in the parallel position. The main body 202 also defines offset position holes 704C that, in conjunction with the central position hole 704A, facilitate receiving the blade mount 107 in the offset position.

In the illustrated example, the blade mount 107 includes the stands 606 to lock into (e.g., snap fit, friction fit, etc.) into the position holes 704. The blade 104 may snap into (e.g., via the mount apertures 308) the blade mount 107.

A handle 706 of FIGS. 7A-7E (sometimes referred to as a "strap") is configured to, on each end, feed through the corresponding handle hole 702 and then be fastened. The handle 706 is made of a flexible material. As best illustrated in FIG. 8, on each end, the handle 706 defines one or more snap holes 708. Rivets 710 formed on a body 712 of the handle 706 are configured to lock into (e.g., snap fit, friction fit, etc.) the corresponding snap holes 708. In such a manner, the handle 706 may be secured to the main body 202.

Although the embodiments of this disclosure have been illustrated in the accompanying drawings and described in the foregoing detailed description, it is to be understood that the present disclosure is not to be limited to just the described embodiments, but that the embodiments described herein are capable of numerous rearrangements, modifications and substitutions without departing from the scope of the claims hereafter. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define an introducing device and/or introducing system. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. The claims as follows are intended to include all modifications and alterations insofar as they come within the scope of the claims or the equivalent thereof.

The invention claimed is:

1. A grooming mount comprising:
a body made of a deformable material configured to deform between a first position and a second position;
wing members, each of the wing members connected to opposite sides of the body, the body defining a first distance between the wing members in the first position and a second, shorter distance in the second position, wherein the wing members are formed of a first material that is stiffer than a second material from which the body is formed;
a blade holder connected to the body; and
a grooming blade fixed to the blade holder, wherein the grooming blade is positioned to groom when the body is in the first position and is not in a position to groom when the body is in the second position as the grooming blade is spaced from the body, wherein the blade holder is integrally formed with the body, wherein the body is positionable in a palm of a user's hand and wherein the grooming mount is selectively transitionable between the first position and the second position based on a configuration of the user's hand.

2. The grooming mount of claim 1, wherein the wing members are integrally formed with the body.

3. The grooming mount of claim 1, wherein the body defines a turning element, and wherein the turning element defines a set of mounting holes.

4. The grooming mount of claim 3, wherein the turning element is rotatable relative to the body.

5. A grooming tool comprising:
a grooming blade configured to groom a coat of an animal;
a grooming mount comprising:
a body made of a deformable material configured to deform between a first position and a second position;
wing members, the body defining a first distance between in wing members in the first position and a second, shorter distance in the second position, wherein the wing members are integrally formed with the body and wherein the wing members are formed of a first material that is stiffer than a second material from which the body is formed; and
a blade holder connected to the body configured to affix to the grooming blade, wherein the grooming blade is positioned to groom when the body is in the first position and is not in a position to groom when the body is in the second position as the grooming blade is not in contact with a coat of the animal and wherein the grooming tool is configured to provide massage in the second position; and
a handle configured to receive a hand, the handle affixed to the grooming mount.

6. The grooming tool of claim 5, wherein the blade holder is integrally formed with the body.

7. The grooming tool of claim 5, wherein the body defines a first plurality of mounting holes and wherein the blade holder detachably connects to the body via stands configured to lock into the first plurality of mounting holes.

8. The grooming tool of claim 7, wherein the body defines a second plurality of mounting holes, the first plurality of mounting holes and the second set plurality of mounting holes having a hole in common.

9. The grooming tool of claim 8, wherein the first plurality of mounting holes and the second plurality of mounting holes each define a line and wherein the line defined by the first plurality of mounting holes is rotationally offset from the line defined by the second plurality of mounting holes.

10. The grooming tool of claim 5, wherein the body defines a turning element, and wherein the turning element defines a plurality of mounting holes.

11. The grooming tool of claim 10, wherein the turning element is rotatable relative to the body.

12. The grooming tool of claim 5, wherein the grooming blade defines a plurality of mounting apertures, wherein the blade mount is configured to couple to the blade via the mounting apertures.

13. The grooming tool of claim 5, wherein the grooming blade comprises a comb section.

14. A grooming mount comprising:
- a body made of a deformable material configured to deform between a first position and a second position;
- wing members, each of the wing members connected to opposite sides of the body, the body defining a first distance between the wing members in the first position and a second, shorter distance in the second position, wherein the wing members are formed of a first material that is stiffer than a second material from which the body is formed;
- a grooming blade; and
- a blade holder connected to the body, wherein the grooming blade is affixed to the blade holder, and wherein the grooming blade is positioned to groom when the body is in the first position and is not in a position to groom when the body is in the second position as the grooming blade is not in contact with a coat of an animal, wherein the grooming mount is configured to provide massage in the second position, wherein the body defines a turning element, and wherein the turning element defines a plurality of mounting holes.

15. The grooming mount of claim 14, wherein the turning element is rotatable relative to the body.

16. A grooming mount comprising:
- a body made of a deformable material configured to deform between a first position and a second position;
- wing members, each of the wing members connected to opposite sides of the body, the body defining a first distance between the wing members in the first position and a second, shorter distance in the second position, wherein the wing members are formed of a first material that is stiffer than a second material from which the body is formed;
- a blade holder connected to the body; and
- a grooming blade affixed to the blade holder, wherein the grooming blade is positioned to groom when the body is in the first position and is not in a position to groom when the body is in the second position as the grooming blade is not in contact with a coat of an animal, wherein the grooming mount is configured to provide massage in the second position, wherein the body defines a first plurality of mounting holes and wherein the blade holder detachably connects to the body via stands configured to lock into the first plurality of mounting holes.

* * * * *